Oct. 28, 1958  D. M. SCHWARTZ  2,857,982
LUBRICATOR
Filed Feb. 16, 1955  2 Sheets-Sheet 1

INVENTOR
DANIEL M. SCHWARTZ
BY Harold T. Stowell
ATTORNEY

Oct. 28, 1958 D. M. SCHWARTZ 2,857,982
LUBRICATOR
Filed Feb. 16, 1955 2 Sheets-Sheet 2

INVENTOR
DANIEL M. SCHWARTZ
BY Harold T. Stowell
ATTORNEY

_United States Patent Office_

2,857,982
Patented Oct. 28, 1958

2,857,982

LUBRICATOR

Daniel M. Schwartz, Salt Lake City, Utah, assignor, by mesne assignments, to The Eimco Corporation, Salt Lake City, Utah, a corporation of Delaware Application February 16, 1955, Serial No. 488,582

4 Claims. (Cl. 184—55)

This invention relates to lubrications means for pressure fluids, and more particularly to lubricators of the type including pressure fluid flow constricting means utilizing the Venturi principle to induce the intake of lubricant into fluids traveling at relatively high velocities through a conduit or the like.

It is a principal object of the present invention to provide means for introducing a lubricant such as oil into an air line to lubricate mechanisms operated by pressure fluid such as compressed air drills, pneumatic hammers and pressure fluid motors. However, the air line lubricator of the present invention is not limited to such uses as the device may be very satisfactorily employed to lubricate bearings and moving parts of non-pressure fluid actuated devices.

A further object is to provide such a device wherein the primary air or pressure fluid passage is substantially unrestricted and the lubricant is efficiently atomized and diffused with the pressure fluid.

A further object of the present invention is to provide such a device wherein the lubricant is effectively dispersed in the pressure fluid eliminating periods of lubricant flooding and lubricant deficiency at the device to be lubricated.

Further objects and advantages of the lubricator of the invention include:

A construction wherein the relative amount of lubricant dispersed into the pressure fluid may be varied within wide limits;

A construction wherein the relative amount of lubricant dispersed in the pressure fluid may not be readily tampered with once a predetermined flow rate is set; and A construction that is simple as to its parts, durable and relatively inexpensive to manufacture.

These and other objects and advantages are provided by the pressure fluid lubricator which generally comprises a body portion having a chamber therein, a pressure fluid inlet in the body portion communicating with the chamber, an outlet for lubricated pressure fluid spaced from the pressure fluid inlet and communicating with the chamber, a lubricant reservoir, conduit means extending between the lower end of the reservoir and the chamber and having an outlet in said chamber, pressure fluid flow constricting means at the outlet of the conduit means to form a zone of low pressure about the outlet when there is a flow of pressure fluid through the chamber whereby lubricant is withdrawn from the reservoir through the conduit.

The invention will be more particularly described with reference to the accompanying drawings wherein:

Fig. 3 is a section on line 3—3 of Fig. 2; and

Fig. 4 is an enlarged fragmentary view in partial section of the conduit means connecting the lubricant reservoir with the mixing chamber including a preferred form of the means providing a zone of low pressure adjacent the chamber end of the conduit means.

Figure 1:
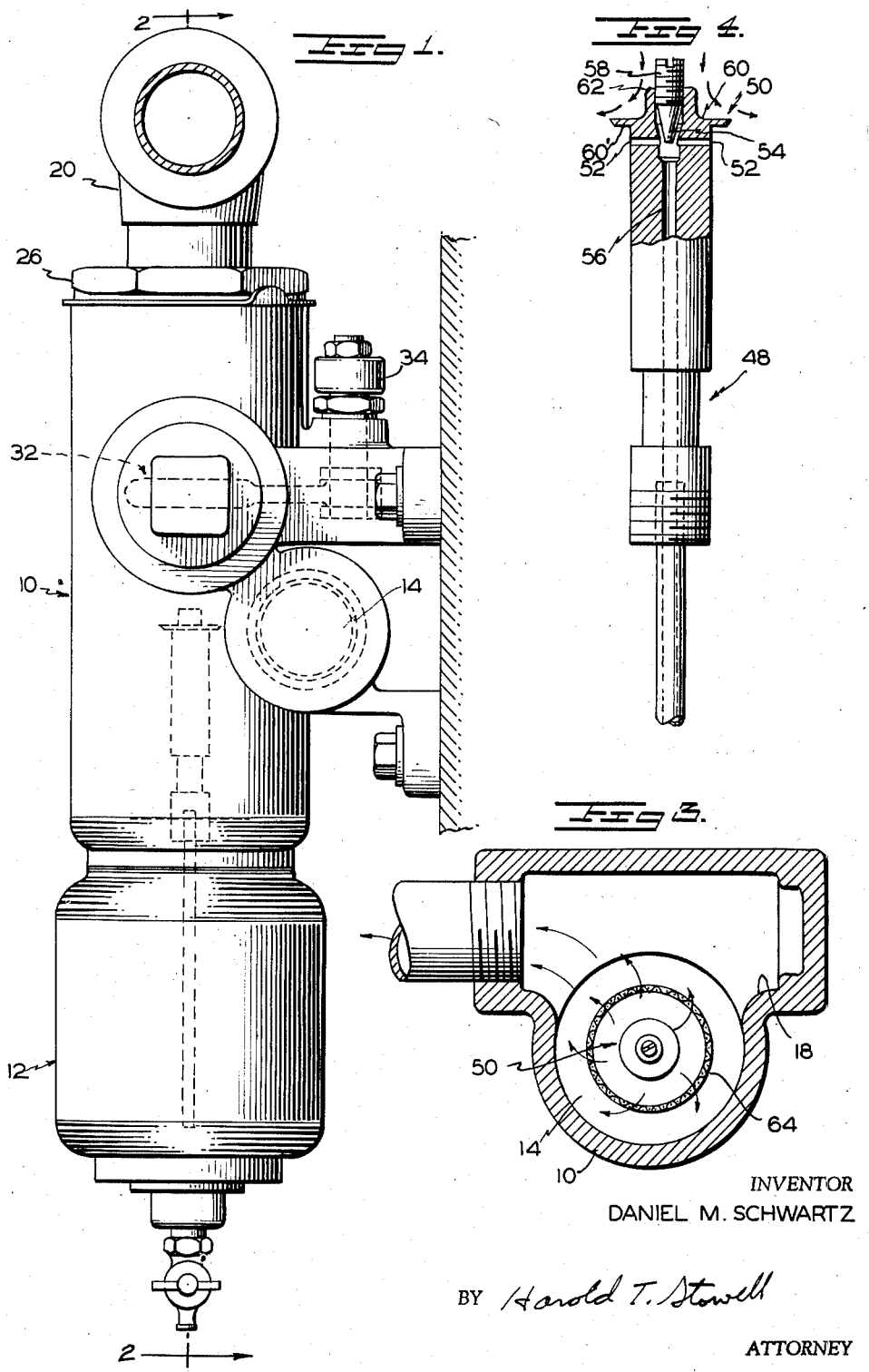
Fig. 1 is a vertical view of a lubricator constructed in accordance with the principles of the present invention.
Figure 2:
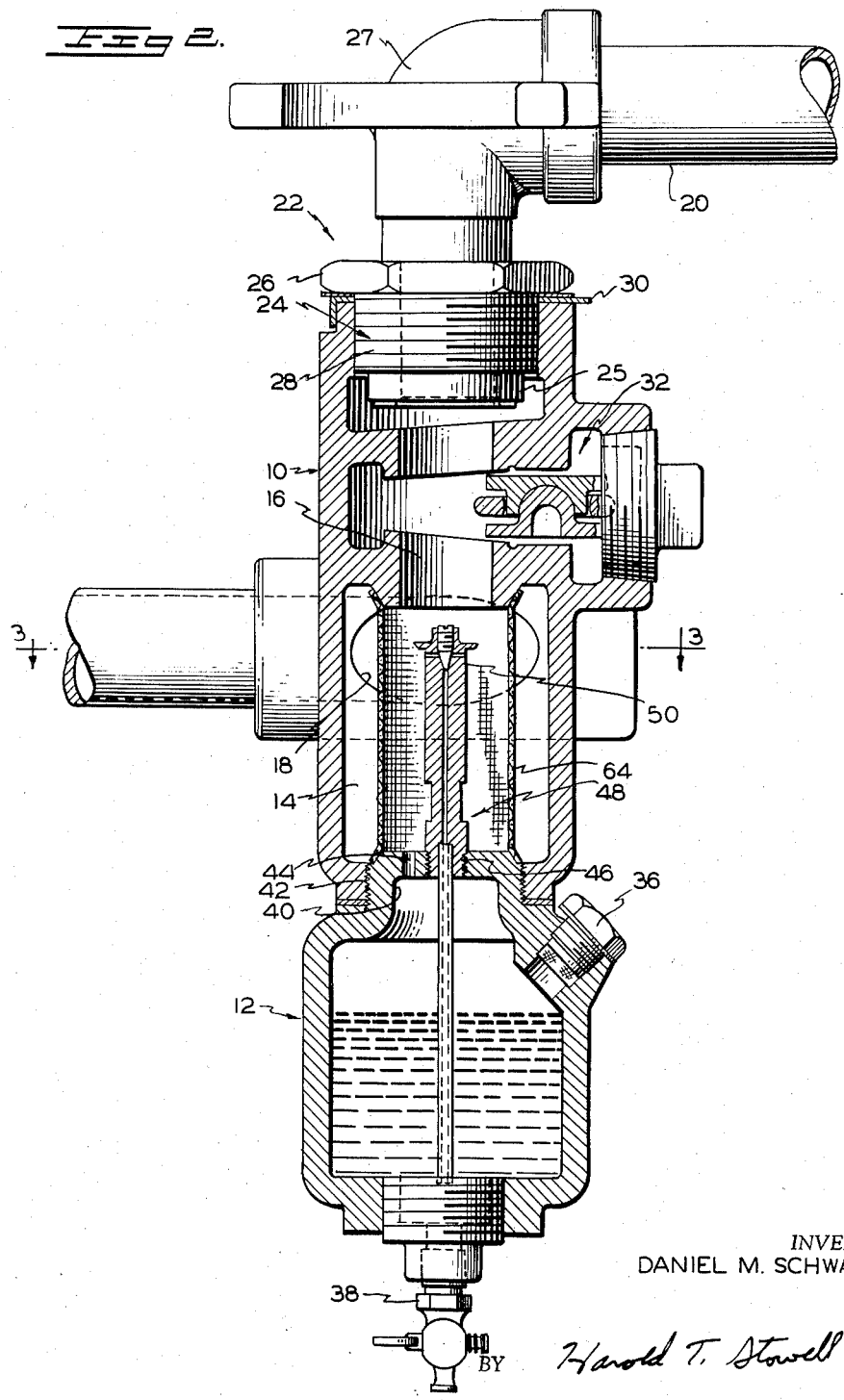
Fig. 2 is a vertical view in partial section of the lubricator shown in Fig. 1 substantially on line 2—2 thereof.

Referring to the drawings and in particular to Figs. 1 and 2 thereof, the pressure fluid lubricator generally comprises a body portion 10 and a lubricant reservoir 12.

The body portion 10 includes a diffusion chamber 14 having an axial air or pressure fluid inlet 16 and a peripheral lubricated pressure fluid outlet 18.

At the upper end of the housing 10 a fluid pressure inlet conduit 20 is swivelly connected to the axial inlet in the body portion. The swivel connection generally designated 22 includes a bushing 24 having a hexagonal flange 26 and external threads 28 below the flange which mate with corresponding internal threads in the axial bore of the body 10.

A lock washer 30 may be provided between the junction of the flange 26 and the periphery of the bore in the body portion to prevent accidental loosening of the bushing 24.

A sleeve 25 connected to elbow 27 rotates in the bore in bushing 24. There is a lapped fit between the lower face of the bushing 24 and the upper face of the sleeve 25 to seal against air leakage at this point.

Between the swivel connection and the chamber 14 a pressure fluid control valve generally designated 32 may be provided to control the flow rate of pressure fluid through the lubricator. The valve 32 as illustrated in the drawings is of the plural disc type and is provided with an actuating lever 34. However, where control of the pressure fluid through the lubricator is desired any suitable control valve may be employed.

The lubricant reservoir 12 may be constructed of any suitable material, such as cast metal, or where visual inspection of the quantity of oil in the reservoir is desired, the reservoir may be constructed of tempered glass or a suitable transparent plastic material. The reservoir is provided with a screw type filler cap 36 and a valved outlet or drain 38. The upper end 40 of the reservoir is provided with screw threads which cooperate with complementary screw threads 42 in the base of the chamber 14 of the body portion.

Two bores 44 and 46 are provided in the head of the upper portion 40. The bore 44 permits the entry of pressure fluid from the chamber 14 into the reservoir 12 whereby the static pressure within the reservoir is maintained substantially equal to the pressure within the chamber 14. The other bore 46 is threaded to receive a conduit means generally designated 48 for the passage of lubricant from the reservoir 12 into the chamber 14 by Venturi type action as to be more fully set forth hereinafter.

In the preferred form of the present invention, the conduit means 48 extends from a position adjacent the lower end of the reservoir 14 to an outlet end 50 concentrically positioned immediately below the pressure fluid inlet 16 and as more clearly shown in Figs. 2 and 3 in the central portion of the air stream issuing therefrom so that head 50 of the oil diffuser is surrounded by the air stream.

As more clearly shown in Fig. 4 of the drawings, the head or outlet end 50 of the conduit means 48 includes a plurality of radial bores 52 which communicate at their inner ends with a tapered passage 54 and the bore 56 in the conduit. A needle valve 58 cooperates at its lower end with the tapered passage 54 to provide control means for the bores 52 whereby the rate of flow of lubricant through the bore 56 may be readily regulated but not accidentally actuated or tampered with once a predetermined flow rate is set. It is evident, however, that on devices where the flow rate is not required to be adjustable the needle valve 58 may be eliminated and the number and size of bores 54 would then determine the flow rate of lubricant under a predetermined flow of pressure fluid through the lubricator.

The upper end 50 of the conduit 48 includes novel pressure fluid flow constricting means to establish a zone of low pressure about the outlets 52 when pressure fluid such as compressed air flows through the chamber 14. The flow constricting means comprises a plate 60 forming a shelf or lip 60' extending radially beyond the radial extension of the bores 52. Head means 62 may be provided above the plate 60 to aid in directing the flow of presure fluid about the lip and to reduce turbulence during high velocity operation of the oiler. The particular shape of the head 62 and the diameter of the plate 60 may be variously modified, depending upon the particular operating conditions under which the lubricator is to be employed.

As the air flows into chamber 14 it impinges upon the upper surface of lip 60' causing an abrupt change in direction of the air current which creates a low pressure zone under the lip adjacent the outlets for the lubricant causing the oil or lubricant in the reservoir 12 to be discharged into the air stream through the plurality of bores 52. It has been found that while such means generally effectively disperses the lubricant into the entire stream of pressure fluid flowing through the chamber 14, an atomizing curtain, screen or perforate plate member 64 may be provided within the chamber 14 on the inlet side of the head portion 50 of conduit 48. The atomizing screen 64 is preferably cylindrical in shape and extends throughout the length of chamber 14 surrounding at its upper end the pressure fluid inlet means 16. The lower end of the cylindrical atomizing screen 64 is engaged by the upper end 40 of the lubricant reservoir 12, whereby the screen or perforate plate means may be readily removed from the chamber 14 for cleaning or replacement.

The cylindrical diffuser and filter screen may be constructed of woven wire or plastic or porous sintered metal or porous ceramic material or the like as is well known in the art. However, very satisfactory results have been obtained employing a metallic screen having openings of about 0.027 inch when the lubricant has an SAE rating of 20.

In the operation of the oiler of the invention, with the valve 32 in the open position as more clearly shown in Fig. 2 of the drawings, pressure fluid such as compressed air flows through conduit 20 and internal inlet passage 16 to the chamber 14. As the compressed air impinges upon the plate 60 of head 50 of the conduit 48 a change in direction of the air creates a zone of low pressure beneath the lip 60' withdrawing lubricant from the reservoir 12 through the conduit 48. The lubricant and pressure fluid in leaving the chamber 14 through outlet 18 passes through the diffuser screen 64 wherein any undispersed droplets of lubricant withdrawn from the reservoir 12 are atomized and dispersed in the pressure fluid. During periods of change in velocity of the pressure fluid flowing through the lubricator, such as during periods of acceleration of the device to be lubricated, when a greater quantity of oil or lubricant is withdrawn from the reservoir 12 any excess oil withdrawn is deposited on the interior surface of the screen 64 from which it may flow into the reservoir through bore 44 or be picked up by other portions of the pressure fluid passing through the diffuser screen.

From the foregoing description it will be seen that the present lubricator fully accomplishes the aims, objects and advantages of the invention and provides an air line lubricator that is both efficient and effective in operation.

It will be further apparent to those skilled in the art that various modifications may be made in the form of the lubricator without departing from the spirit and scope of the invention as defined in the appended claims.

I claim:

1. An air line lubricator comprising a body portion having a chamber therein, an axial pressure fluid inlet for said chamber, and a radial outlet therefrom, a lubricant reservoir, conduit means extending from the reservoir to the chamber and terminating in said chamber axially thereof below the pressure fluid inlet, a lubricant outlet in the chamber from the conduit means positioned normal to the flow of pressure fluid through the pressure fluid inlet, plate means in the chamber positioned with the extended surface thereof normal to and coaxial with the pressure fluid inlet and above the lubricant outlet from the conduit means to form a zone of low pressure about the lubricant outlet when there is a flow of pressure fluid through said chamber whereby lubricant is withdrawn from the reservoir.

2. An air line lubricator comprising a body portion having a chamber therein, a pressure fluid inlet for said chamber and outlet means therefrom, a lubricant reservoir, conduit means extending from the reservoir to the chamber and terminating in said chamber, said conduit means extending longitudinally into the pressure fluid flow from said inlet, a lubricant outlet from the conduit means, and plate means in the chamber positioned with the extended surface thereof perpendicular to the direction of flow of the pressure fluid and between the lubricant outlet and pressure fluid inlet to form a zone of low pressure about the lubricant outlet when there is a flow of pressure fluid through said chamber whereby lubricant is withdrawn from the reservoir.

3. The invention defined in claim 2 including regulating means carried by said conduit means for controlling the flow rate of lubricant therethrough.

4. The invention defined in claim 2 including a perforated lubricant diffuser screen in said chamber extending between the pressure fluid inlet and the outlet from the chamber.

References Cited in the file of this patent

UNITED STATES PATENTS

| 1,012,114 | Templeton | Dec. 19, 1911 |
| 1,600,262 | Wickham | Sept. 21, 1926 |
| 1,939,563 | McDowell | Dec. 12, 1933 |
| 2,220,301 | Terry | Nov. 5, 1940 |
| 2,245,274 | Holmboe et al. | June 10, 1941 |
| 2,511,016 | Semon | June 13, 1950 |
| 2,613,067 | Goodyer | Oct. 7, 1952 |

FOREIGN PATENTS

| 322,955 | Great Britain | Dec. 19, 1929 |